United States Patent
Seale

(10) Patent No.: US 8,520,138 B1
(45) Date of Patent: Aug. 27, 2013

(54) DIGITAL PANORAMIC CAMERA WITH FEATURES FOR ENHANCED IMAGE QUALITY AND IMPROVED USER INTERFACE

(76) Inventor: Ansen B. Seale, San Antonio, TX (US)

( * ) Notice: Subject to any disclaimer, the term of this patent is extended or adjusted under 35 U.S.C. 154(b) by 1915 days.

(21) Appl. No.: 09/900,361

(22) Filed: Jul. 6, 2001

Related U.S. Application Data

(60) Provisional application No. 60/216,582, filed on Jul. 7, 2000.

(51) Int. Cl.
*H04N 5/225* (2006.01)
*H04N 9/07* (2006.01)

(52) U.S. Cl.
USPC ............................................ 348/375; 348/336

(58) Field of Classification Search
None
See application file for complete search history.

(56) References Cited

U.S. PATENT DOCUMENTS

| | | | |
|---|---|---|---|
| 4,058,831 A | 11/1977 | Smith | 358/87 |
| 5,237,363 A * | 8/1993 | Okada et al. | 396/55 |
| 5,262,852 A | 11/1993 | Eouzan et al. | 358/87 |
| 5,262,867 A | 11/1993 | Kojima | 358/209 |
| 5,510,830 A | 4/1996 | Ohia et al. | 348/36 |
| 5,548,409 A | 8/1996 | Ohta et al. | 358/335 |
| 5,563,650 A | 10/1996 | Poelstra | 348/36 |
| 5,576,757 A | 11/1996 | Roberts et al. | 348/207 |
| 5,740,480 A * | 4/1998 | Kuhn et al. | 396/177 |
| 5,877,866 A * | 3/1999 | Noguchi | 358/296 |
| 5,887,087 A * | 3/1999 | Tamagawa et al. | 382/312 |
| 6,122,003 A * | 9/2000 | Anderson | 348/207.99 |
| 6,545,701 B2 * | 4/2003 | Sinclair et al. | 348/36 |
| 6,549,958 B1 * | 4/2003 | Kuba | 710/14 |
| 6,570,619 B1 * | 5/2003 | Takayama | 348/342 |
| 6,930,703 B1 * | 8/2005 | Hubel et al. | 348/37 |

* cited by examiner

*Primary Examiner* — Luong T Nguyen
(74) *Attorney, Agent, or Firm* — Wayne J. Colton, Inc.

(57) ABSTRACT

A digital panoramic camera generally comprises a lens dependently secured to a body. The body comprises a power side, control side and rear compartment wherein the internal components of the digital panoramic camera are distributed such that their weight is uniformly placed about the axis of rotation for the camera. Because the axis of rotation for the camera passes through the nodal point of the lens, a slotted aperture is provided in the body in order that the camera may nonetheless have a nearly 180° vertical field of view. A novel lens cover, having a slotted aperture therein, is provided for reduction or elimination of flare, thereby improving image quality. Provisions are also made for elimination of fringe effects and blooming as well as for improved user interface with the camera. A novel interface permits operation of the camera as either a stand-alone or peripheral device.

21 Claims, 9 Drawing Sheets

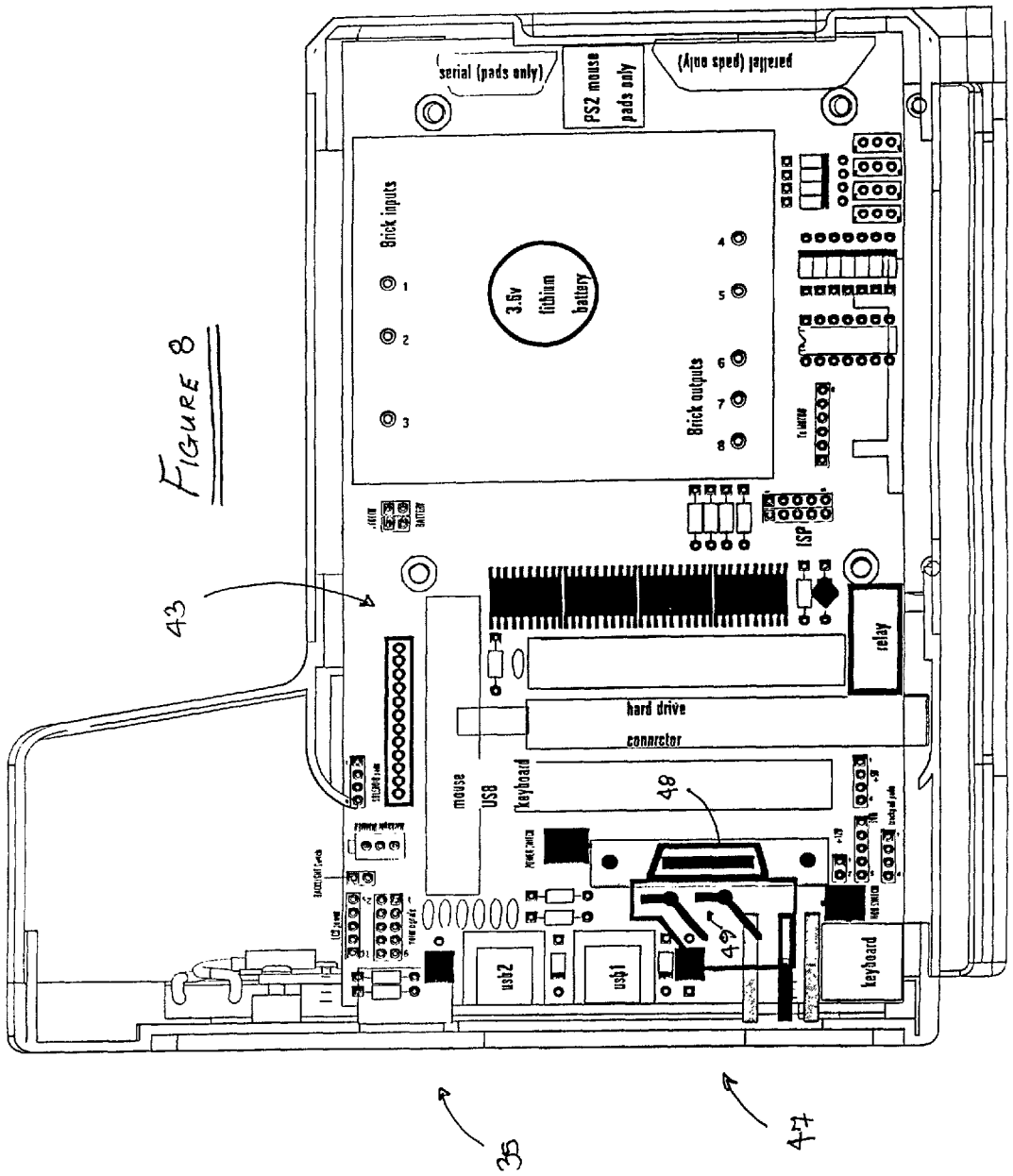

DIGITAL PANORAMIC CAMERA WITH FEATURES FOR ENHANCED IMAGE QUALITY AND IMPROVED USER INTERFACE

RELATED APPLICATIONS

The present application claims, under 35 USC §119(e), all available benefit of the filing of U.S. provisional patent application Ser. No. 60/216,582 filed Jul. 7, 2000. By this reference, the full disclosure, including the drawings, of U.S. provisional patent application Ser. No. 60/216,582 is incorporated herein as though now set forth in its entirety.

FIELD OF THE INVENTION

The present invention relates to panoramic photography. More particularly, the invention relates to a digital panoramic camera with provisions for elimination of flare, backlash and blooming effects as well as is also easier to operate for the capture and subsequent processing of wide field of view digital panoramic images.

BACKGROUND OF THE INVENTION

As an improvement over traditional panoramic cameras, digital panoramic cameras have been developed to capture images at very high resolutions. As a result, it is now possible to acquire a 360° panoramic image at a quality comparable with traditional film techniques, but with the advantages of instant feedback and elimination of the requirements for purchasing film, processing the exposed film and, if desired in digital format, scanning the developed images. Further, a virtual tour may be produced as one seamless image, avoiding the necessity to stitch together many of individual images. Finally, because the camera rotation takes place about an axis that extends through the optical center of the lens, foreground/background distortion and warping are largely eliminated.

Unfortunately, very few improvements directed toward image quality have followed the advent of the digital panoramic camera. For example, because a panoramic camera will always encounter the sun at some point during a 360° outdoor image, a bright flare will appear on the image whenever the sun or main illumination of the scene strikes the surface of the lens. It is therefore a specific object of the present invention to improve over the digital panoramic cameras of the prior art by providing a lens and/or lens cover that reduces or eliminates this deleterious effect.

Because digital panoramic cameras are also adapted to acquire a very large image, such cameras are often utilized in their full capacity to capture a 360° view. Likewise, it is desirable to adapt the camera to acquire this 360° view in as close to a 180° vertical field of view as possible, thereby imaging the entire scene from zenith to nadir. In previous designs, such an image could only be acquired by positioning the lens at or near an outer edge of the camera. Because, however, the camera should rotate about an axis through the front nodal point of the lens, such a configuration requires all of the electronic components for the operation of the camera to be located behind the lens. Unfortunately, this lopsided arrangement results in distortion of the image due to backlash caused by play between the gears driving rotation of the camera. This effect is especially pronounced when the camera is oriented to take a panoramic image rotating in a vertical plane. It is therefore a specific object of the present invention to improve over the prior art by providing an arrangement for increased vertical field of view in a panoramic camera. It is a related object of the present invention to provide such an arrangement that also eliminates image distortion from backlash.

Additionally, digital panoramic photography, like other applications of slit scan imaging, is subject to fringe effects whenever moving objects are imaged. As known to those of ordinary skill in the art, the charge coupled devices utilized in digital imaging applications are generally monochromatic—a separate device having a decal filter being used to image each of the three primary colors. Although normally implemented on a single integrated circuit package, each separate imaging device is nonetheless spaced one from another at about 14 µm between imaging lines. Consequently, there results a small time delay between imaging of the red, green and blue components of an image. While this presents no problem when imaging a stationary object or an object the color of which does not change, the time delay results in a "fringe" of red, green or blue when imaging a moving object, such as a moving car, walking person, flowing water or waving flag. Likewise, a flashing red light may altogether fail to image or a flashing white light may appear red, green or blue. It is therefore another object of the present invention to improve over the prior art by providing a digital panoramic camera capable of imaging moving or changing subjects without the otherwise inherent fringe effects. As will be better understood further herein, it is a related object of the present invention to provide such a camera wherein software otherwise required for synchronization of the red, green and blue components of an image may be eliminated or simplified. Finally, it will also be understood to be a related object of the present invention to provide such a camera wherein certain filters may be eliminated through combination with components of the present invention directed toward elimination of fringe effects.

As has been previously discussed, digital panoramic cameras are well suited for the acquisition of images in a full 360° horizontal field of view. Unfortunately, this requires that the camera operator take increased care to ensure that he or she remains clear of the camera's field of view during imaging. Likewise, the operator must ensure that any ancillary equipment also remains clear of the camera's field of view. It is therefore yet another object of the present invention to provide a digital panoramic camera that includes specific adaptations for facilitating the capture of a wide image without interference by operator or ancillary equipment, such as laptop computers or external power supplies. As will be better understood further herein, it is also a related object of the present invention to in at least one embodiment provide a solution that also contributes to the camera's ability to image in a near 180° vertical field of view.

Digital photography is also known to be subject to "blooming" or "tearing" effects resulting from the introduction through the lens to the charge coupled devices of over-saturating light. Although known to be a problem with digital photography in general, Applicant has found the problem to be particularly difficult in panoramic photography, especially when imaging in wide vertical fields of view. This, of course, is due to the increased difficulty associated with avoiding sources of bright light during at least some portion of the imaging process. As a result, it is a still further object of the present invention to provide a digital panoramic camera including an integral accessory adapted to preclude introduction to the lens of over-saturating light.

Because of manufacturing defects and pixel inconsistencies in charge coupled devices, such devices must generally be calibrated to a "dark" value in order to best acquire an image. In the past, arrangements have been proposed for moving the entire charge coupled device assembly behind an internal curtain in order that such a calibration may be made. This, however, is cumbersome. It is therefore an object of the present invention to provide a simplified mechanism through which dark value calibration of the camera may be conducted. As will be better understood further herein, it is a related object of the present invention to also provide such a mechanism that contributes to power conservation on-board the camera, thereby facilitating the implementation of other features described herein.

Finally, it is noted that many of the foregoing objects of the present invention are met through implementation of previously unattained intelligence on-board the preferred embodiment of the camera. In particular, it will be understood further herein that the preferred embodiment of the present invention comprises a microprocessor-based design capable of running an off-the-shelf operating system. While those of ordinary skill in the art will recognize that this provision enables many previously unavailable features, it also makes difficult the traditional use of the camera as a peripheral device. This especially makes difficult the export to other stand-alone computer systems of acquired image data. It is therefore a specific object of the present invention to improve over the prior art by providing a computer-based camera system having a mass storage device that is adapted for selective operation as either an autonomous system or as a peripheral storage device.

SUMMARY OF THE INVENTION

In accordance with the foregoing objects, the present invention—a digital panoramic camera with provisions for enhanced image quality and improved user interface—generally comprises a lens dependently secured to a body. The body has a battery-based power side, control side and rear compartment wherein the internal components of the digital panoramic camera are distributed such that their weight is uniformly placed about the axis of rotation for the camera. Because the axis of rotation for the camera passes through the front nodal point of the lens, a slotted aperture is provided in the body in order that the camera may nonetheless have a nearly 180° vertical field of view. A novel lens cover, having a slotted aperture therein, is provided for reduction or elimination of flare, thereby improving image quality. Provisions are also made for elimination of fringe effects and blooming as well as for improved user interface with the camera. A novel interface permits operation of the camera as either a stand-alone or a peripheral device.

Finally, many other features, objects and advantages of the present invention will be apparent to those of ordinary skill in the relevant arts, especially in light of the foregoing discussions and the following drawings, exemplary detailed description and appended claims.

BRIEF DESCRIPTION OF THE DRAWINGS

Although the scope of the present invention is much broader than any particular embodiment, a detailed description of the preferred embodiment follows together with illustrative figures, wherein like reference numerals refer to like components, and wherein:

FIG. 8 shows, in a schematic drawing, various internal components of the camera of the present invention, including a novel interface for facilitating use of the camera's hard disk drive as both a stand-alone computer drive and a peripheral storage device.

DETAILED DESCRIPTION OF THE PREFERRED EMBODIMENT

Although those of ordinary skill in the art will readily recognize many alternative embodiments, especially in light of the illustrations provided herein, this detailed description is exemplary of the preferred embodiment of the present invention, the scope of which is limited only by the claims appended hereto.

Figure 1:
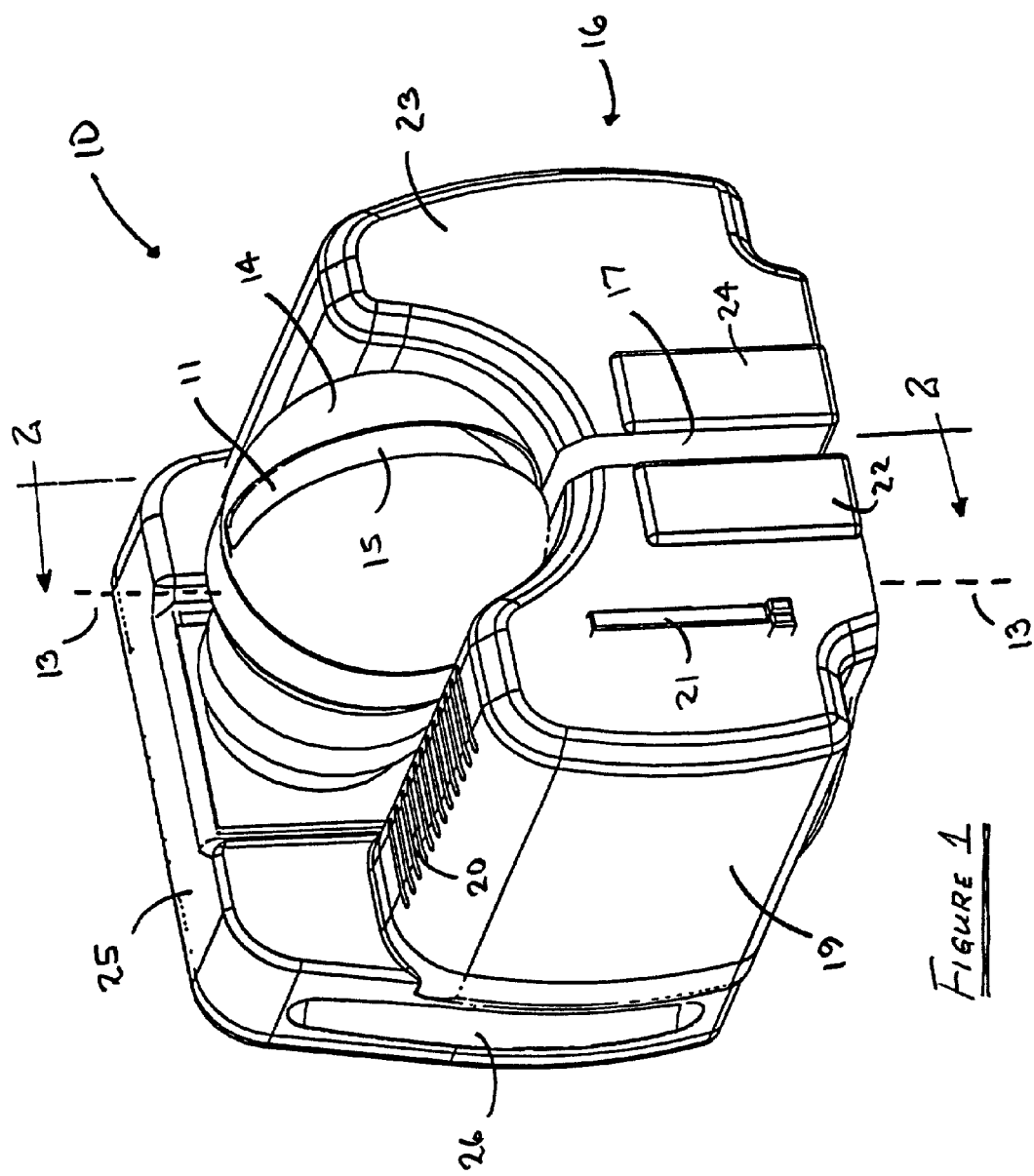
FIG. 1 shows, in a perspective view, the preferred embodiment of the digital panoramic camera of the present invention.
Figure 2:
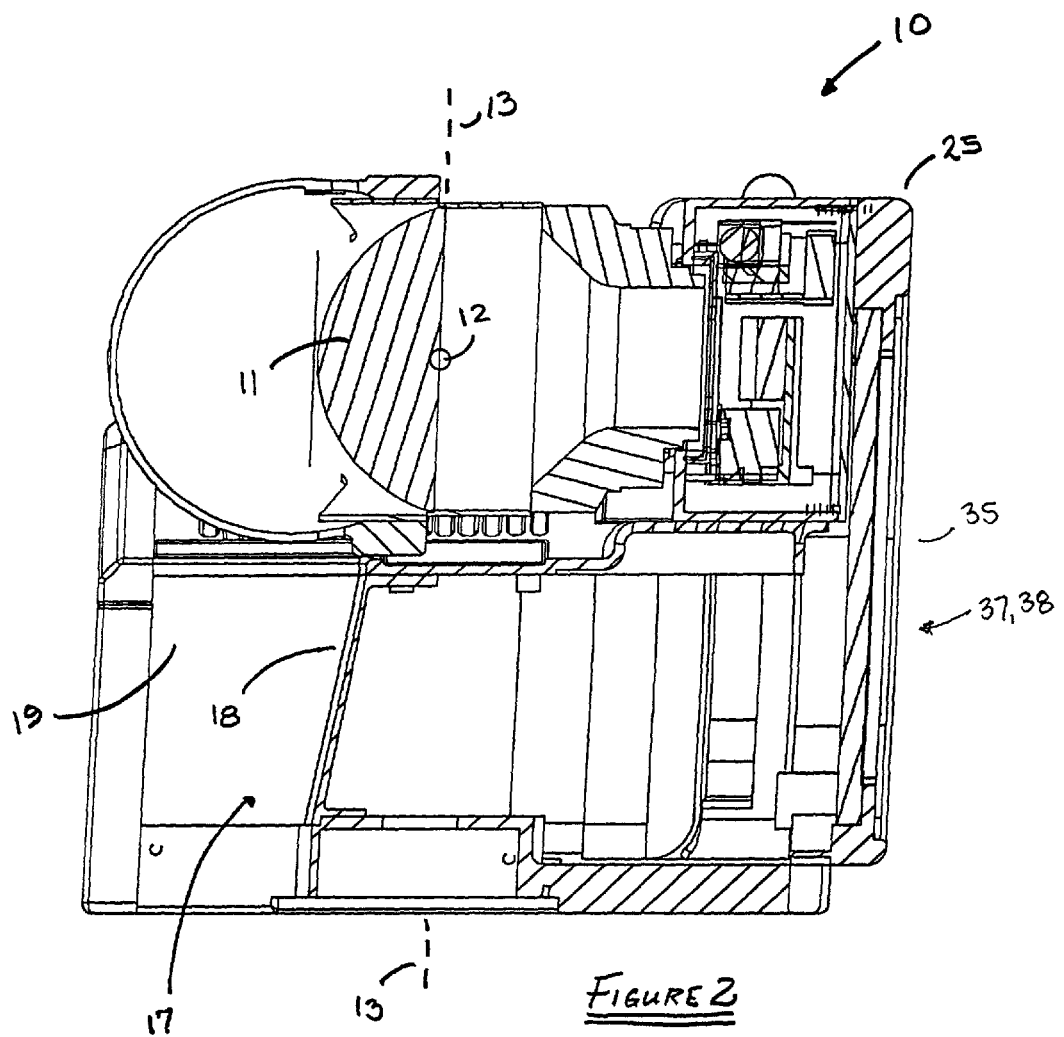
FIG. 2 shows, in a cross sectional view taken through line 2-2 of FIG. 1, details of the novel arrangement of the components of the camera of FIG. 1.

Increased Vertical Field of View:

Referring now to the Figures, a component arrangement for increased vertical field of view of a panoramic camera is shown. As shown in FIG. 1, the digital panoramic camera 10 of the present invention generally comprises a lens 11 dependently secured to a body 16. Although not shown in the figures, it is to be understood that the body 16 is adapted for 360° of rotation about axis of rotation 13, which passes through the front nodal point 12 of the lens 11. As will be better understood further herein, the internal components for operation of the digital panoramic camera 10 are distributed throughout the body 16 such that their weight is uniformly distributed about the axis of rotation 13.

In order to achieve the desired weight distribution, Applicant has found it necessary to position some of the internal components forward of the lens 11. This arrangement is possible due to the very limited horizontal field of view seen by the camera 10 at any one time. In order, however, to nonetheless achieve a vertical field of view approaching 180°, the body 16 is divided into a power side 19 and control side 23 separated by a slotted aperture 17. This aperture 17 comprises a slanted rear face 18, thereby maximizing internal space for housing of electronic and other components without obstruction of the camera's field of view. Additionally, canting the lower portion of the slotted face 18 forward enables a sufficiently wide base for placement of the camera's mount in the axis of rotation 13. As will be appreciated by those of ordinary skill in the art, the mounting portion of the camera 10 must be wide enough to impart stability to the camera 10 as it rotates upon a standard tripod or the like.

As shown in the Figures, the body 16 generally comprises power side 19, control side 23 and rear compartment 25. The power side 19, which may comprise cooling slots 20, is noted to be slightly less tall than the control side 23. This is due to the extreme care taken to distribute the weight of the internal components about the axis of rotation 13 while nonetheless providing for maximum access to the lens 11 for removal and replacement of the lens 11 and access to the aperture ring.

Flare Reduction:

As shown particularly in FIG. 1, the lens 11 is provided with a lens cover 14 for reduction of flare, as is known by those of ordinary skill in the art to result from the incidence upon the lens of bright light. The lens cover 14 comprises a slotted aperture 15 that allows only that light which will be refracted upon the camera's internal imaging device 27 to enter the lens 11. Although a separate lens cover 14 is shown in the figure, it is to be expected that even better flare reduction may be achieved by providing a covering for the lens 11 integral with the outer surface thereof. As will be appreciated by those of ordinary skill in the art, especially in light of this exemplary discussion, such an integral cover provides for the gentlest transition into and out of regions of bright light such as may be encountered when imaging outdoors in bright, directional sunlight. The aperture of such a lens cover is matched to the exact angle required by the imaging element 27 at maximum aperture so as to minimize the surface of the lens 11 exposed to direct illumination.

Figure 3:
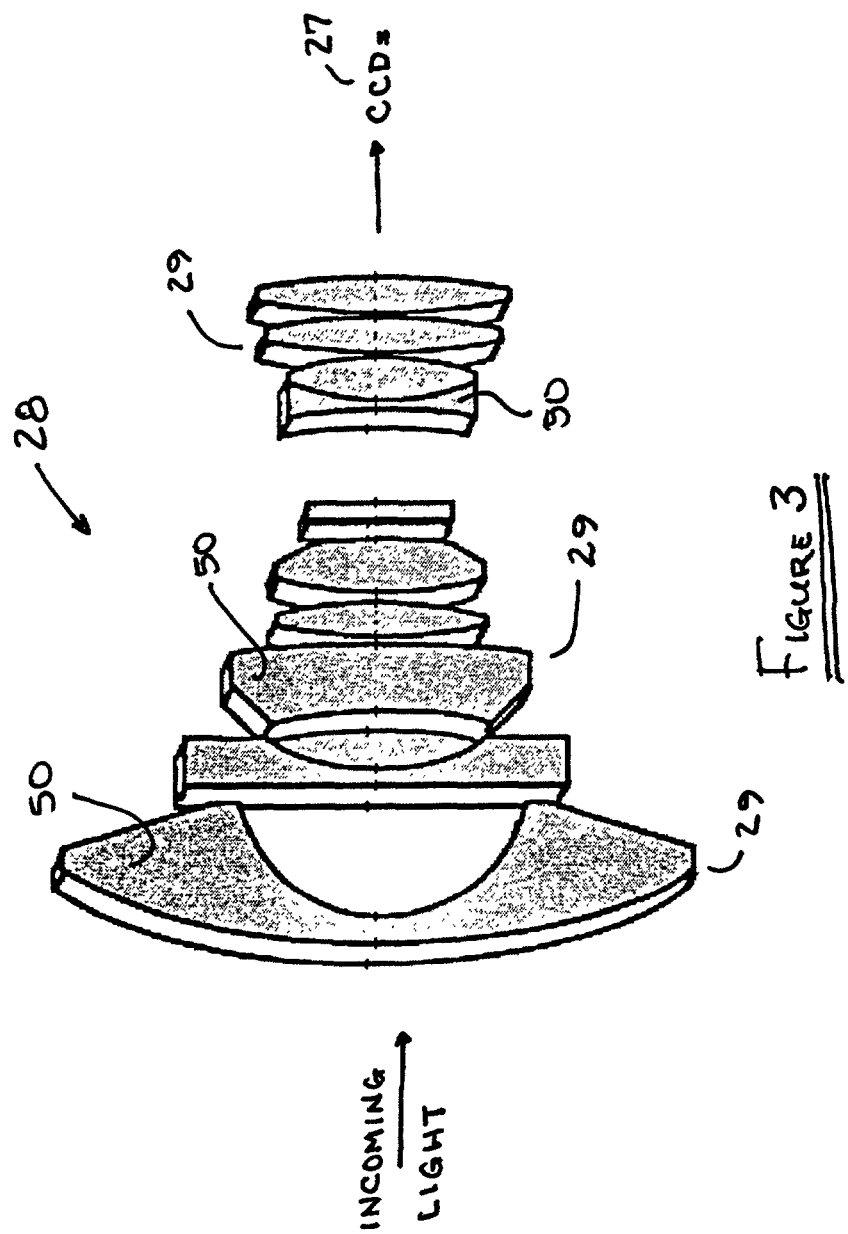
FIG. 3 shows, in a functional block diagram, a sectional lens design specifically adapted for use with the present invention.

In a preferred alternative, however, the lens itself may be formed in a "sectional" shape 28, as shown in FIG. 3, for admitting only that light as will be directed upon the charge coupled device 27. Optimization of the lens shape in this manner also results in decreased weight and size for the camera. Because plastic may be utilized to manufacture a lens of sufficient optical quality for use with a charge coupled device and is generally easier than is glass to manufacture in an aspheric form, which is known to be the required lens shape for imaging large vertical fields of view while maintaining rectilinearity, the sectional lens elements 29 of the present invention are preferably manufactured from a plastic material. As will be recognized by those of ordinary skill in the art, the choice of plastic material also serves to further reduce the weight of the complete camera 10. In any case, the sides 50 of each element 29 are preferably painted or otherwise made to be flat black in color to minimize or prevent undesired internal reflections.

Figure 4:
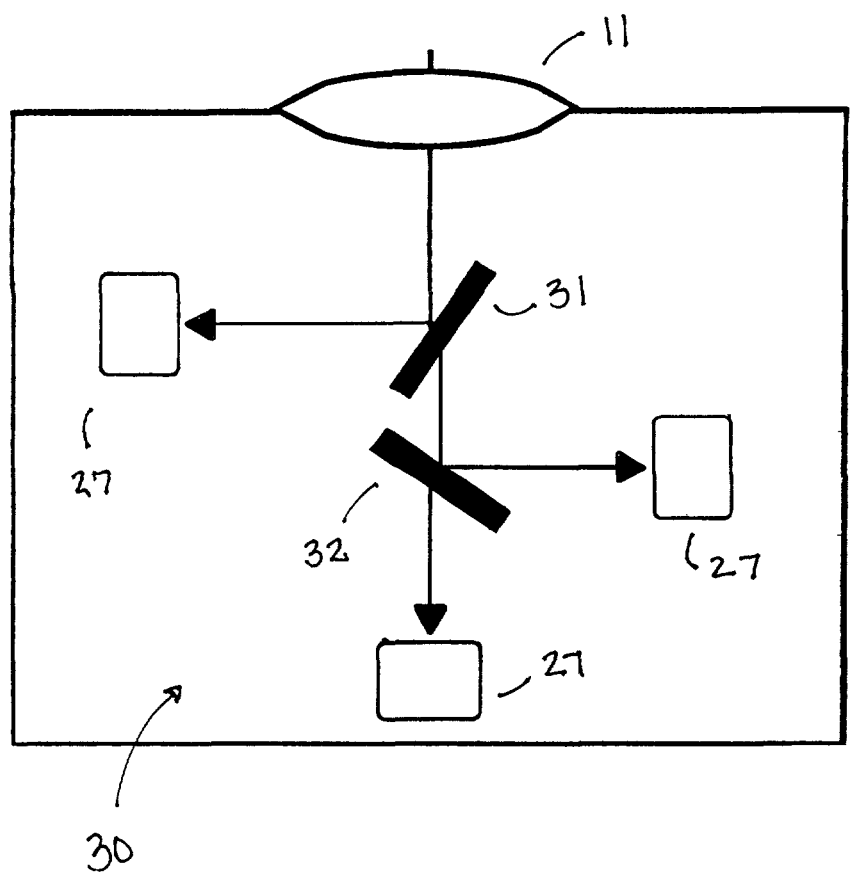
FIG. 4 shows, in a functional block diagram, a dichroic filter arrangement for use in elimination of fringe effect from digital panoramic photography.

Elimination of Fringe Effect Concomitant the Imaging of Moving Objects:

In order to avoid the fringe effect concomitant the imaging of moving objects with the digital panoramic camera 10 of the present invention, Applicant has found it advantageous to split the incident light into its red, green and blue constituent components. As shown in FIG. 4, the preferred embodiment of the present invention preferably comprises a dichroic filter arrangement 30 for performance of the beam splitter function. As is generally known to those of ordinary skill in the art, the dichroic filter reflects all wavelengths less than a threshold while passing therethrough all wavelengths greater than the threshold. As shown in the figure, a first dichroic filter 31 is utilized to reflect the blue light while passing the green and red light. Likewise, a second dichroic filter 32 is then utilized to reflect the green light while passing the red light. Although those of ordinary skill in the art will recognize that other arrangements are possible for implementing the present invention, it will also be appreciated that due to the relative sensitivity of a charge coupled device 27 to blue, green and red light, from least to greatest respectively, the arrangement 30 contemplated by Applicant is preferred for ensuring adequate light energy in each constituent component.

Figure 4A:
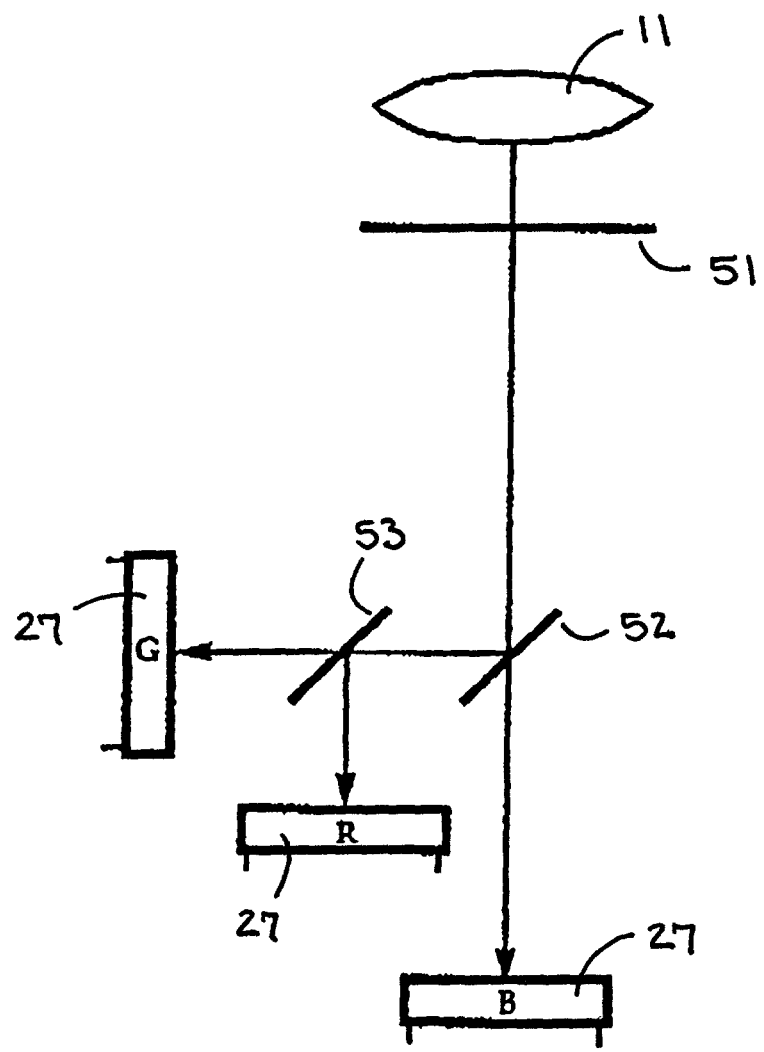
FIG. 4A shows, in a functional block diagram, a second dichroic filter arrangement for use in elimination of fringe effect from digital panoramic photography.

Those of ordinary skill in the art will also recognize that a third dichroic filter, or other filtering device, as shown in the alternatively preferred arrangement of FIG. 4A, may be employed to eliminate the infrared component prior to imaging of the red component, thereby further enhancing the image quality. Referring to FIG. 4A, a "hot mirror" filter 51 is shown interposed the light path between the lens 11 and the imaging devices 27. As known by those of ordinary skill in the art, the hot mirror filter 51 generally passes wavelengths from about 420 nanometers ("nm") to about 680 nm, while generally reflecting the infrared portion of the spectrum greater than about 725 nm. In the embodiment shown, the remaining incident light is then passed to a first dichroic filter 52 adapted to generally pass wavelengths between about 300 and 500 nm while reflecting wavelengths in the range of about 535 to 625 nm. In this manner, the blue component of the incident light is passed through the first filter 52 to a first imaging device 27 while the red and green components are reflected toward a second dichroic filter 53. The second dichroic filter is adapted to generally pass wavelengths between about 350 and 550 nm while reflecting wavelengths in the range of about 589 to 688 nm, effectively splitting the red and green components of the incident light to separate imaging devices 27.

Figure 5:
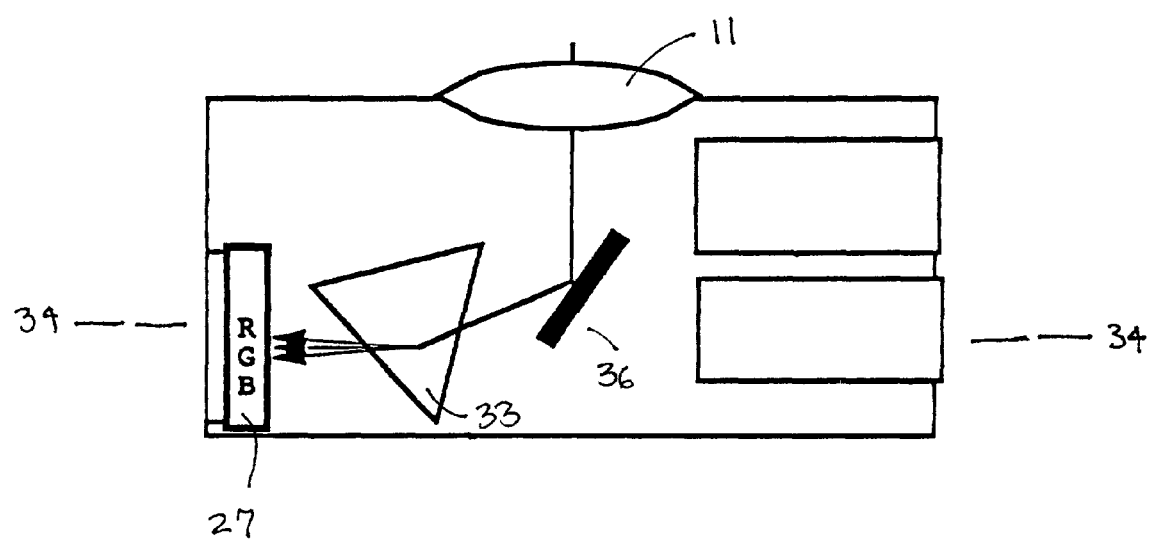
FIG. 5 shows, in a functional block diagram, an alternative arrangement for elimination of fringe effect.

In the alternative, those of ordinary skill in the art will recognize that a prism may be utilized for the beam splitting function, as shown in FIG. 5 with a mirror 36, the function of which will be detailed further herein. Those of ordinary skill in the art will also recognize, however, that a prism 33 splits the entire image and therefore may result in some overlap between the red, green and blue components. Additionally, it is noted that the use of dichroic filters may also enable elimination of the necessity for use of a separate infrared filter. In any case, be it through a dichroic filter arrangement 30, a prism 33 or a substantial equivalent of either, once the incident light beam is split into its constituent components, each component may be imaged simultaneously with a monochrome charge coupled device sensor 27. In this manner, the time delay between imaging of red, green and blue components, as known to those of ordinary skill in the art to be an inherent difficulty with digital panoramic photography, is eliminated. Ultimately, the provisions of the present invention result in elimination of synchronization software as well as color fringe effects, which are unavoidable while imaging moving or changing objects with current single chip designs.

Improved User Control Interface Facilitating 360° Imaging:

As has been previously noted, the taking of a panoramic image in a 360° horizontal field of view presents several unique difficulties. Among these difficulties is the necessity for the camera operator to stay clear of the lens' field of view during imaging. As a result, Applicant has found it desirable to ensure that all user interface with the camera 10 takes place either directly behind the lens 11 or, in a preferred alternative, entirely remote from the camera 10. In any case, the implementing engineer must remember that it is critical to maintain the camera balance about the lens' nodal point 12. Because of this limitation, Applicant has found it necessary in the first case to redirect light transmitted through the lens into a transverse axis 34, as shown in FIG. 5, in order to make room for the provision of a user interface 35 at the rear of the camera 10.

As shown in the figure, a mirror 36 is provided at approximately a 45° angle in the light path behind the lens 11 in order to redirect the light from the lens 11 into a transverse axis 34. In this manner, the imaging hardware 27, as preferably implemented according to the teachings herein, may be placed to the left or right outer sides of the camera 10. Displacement of the imaging hardware 27 thus makes room behind the lens 11 for the provision of a display device 37 and/or an input device 38 without upsetting the component balance about the camera's axis of rotation through the lens' nodal point 12.

As will be appreciated by those of ordinary skill in the art, however, reflection of the light with such a mirror 36 is disadvantageous to the extent that light energy is lost through the process. Because, as has been previously discussed, it is highly desirable in other aspects of the present invention to spit the incident light into its constituent red, blue and green components, any such power loss is preferably avoided. As a result, Applicant has found it most desirable to avoid bending of the light path by providing a user interface 35 entirely remote from the camera 10. To this end, it is preferred that image data—which may comprise display data or, with a broadband link, all captured data (which ultimately may enable the elimination of on-camera data storage requirements)—be transmitted from the camera 10 to a remote user control module, which in turn is adapted to transmit control information back to the camera. Such a control module preferably comprises a face-mounted display system, such as a modified version of that technology readily commercially available from Olympus America, Inc. under the trade designation "EYE-TREK." Because the processor of the camera 10 of the present invention is adapted to run a standard operating system, as discussed in more detail further herein under the heading "Selectively Utilizable Peripheral Device Mode," such an implementation is readily within the ordinary skill in the art.

Those of ordinary skill in that art will also recognize that other advantages in addition to preservation of light energy en route the imaging device also result from the described implementation. For example, this aspect of the present invention serves to further reduce the overall size and weight of the camera 10, thereby facilitating component placement about the axis of rotation 13 as well as making the camera easier to store and transport. Additionally, the export of the user interface 35 contributes to minimized power consumption onboard the camera 10. Still further, by exporting the user interface 35 to an off-camera module, additional off-the-shelf components may be implemented within the camera 10 to make advantageous use of the operating system. For example, hardware may be provided for on-camera exposure compensation and/or a sound card may be provided within the camera 10 for capturing high-quality sound data in the proximity of the operator's subject. Implementation of these and other similar extensions of the present invention are readily within the ordinary skill in the art, especially in light of this exemplary description and the descriptions to follow.

Figure 6:
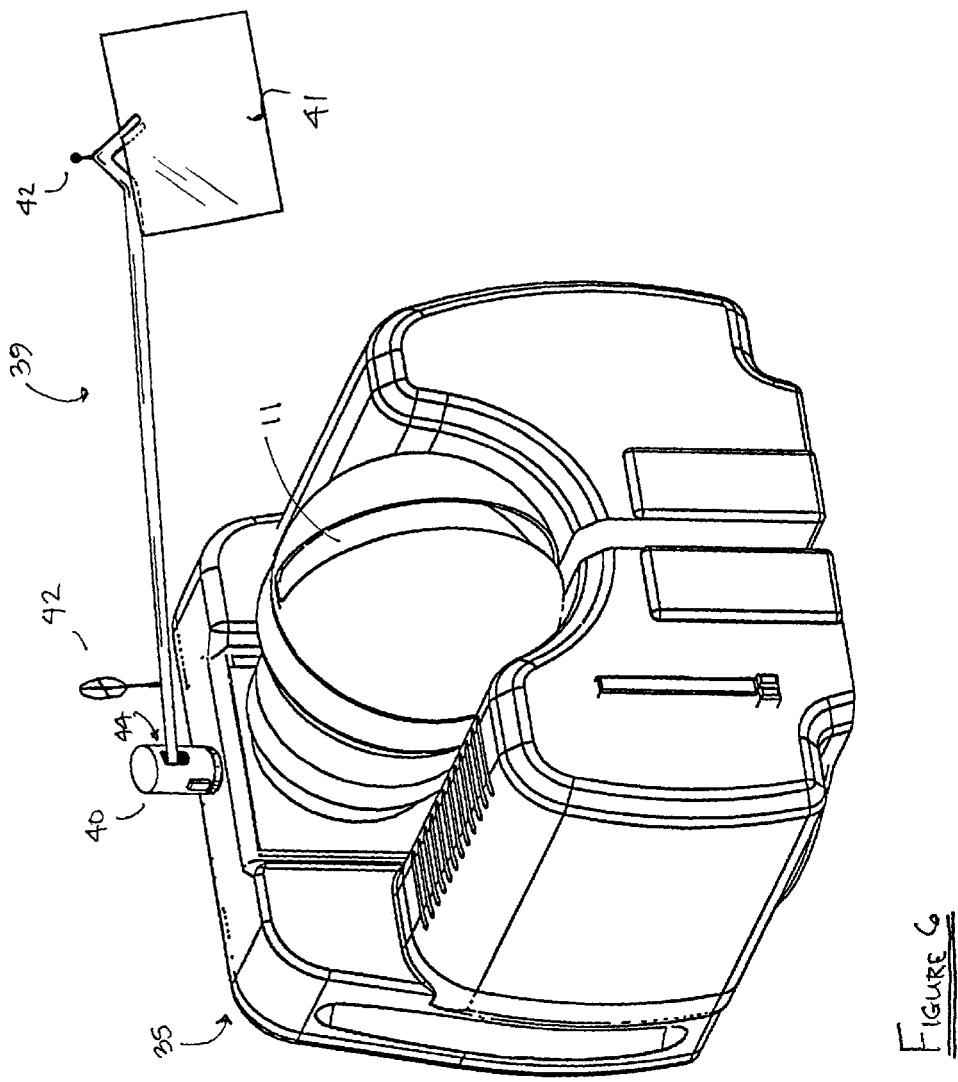
FIG. 6 shows, in a perspective view, a novel shade system for use in panoramic photography.

Elimination of "Blooming" or "Tearing" Effects of High-Intensity Point Sources:

As shown in FIG. 6, Applicant has devised a novel active sunshade 39 in order to prevent over-saturation of the charge coupled device 27, as may otherwise result from the unavoidable imaging of point sources. As shown in the figure, one or more motors 40 are provided to maintain the position of the active filter 41 with respect to the point source such that as the camera 10 rotates the filter 41 always precludes the introduction to the lens 11 of over-saturating light. As also shown in the figure, a targeting system 42 may be provided for initial alignment of the active filter 41 with the point source. The motor 40 associated with the active shade 39 is synchronized with the horizontal position and speed control portions of the camera's controller 43. Additionally, a vertical control motor 44 may be provided to enable the shade 39 to selectively "dip" into view at only those points at which the high intensity light source or sources may be expected during the panoramic rotation. As with other aspects of the present invention, the necessary programming for synchronization and control of the shade 39 is readily within the ordinary skill in the art, especially when this aspect of the present invention is implemented with other aspects dictating the implementation onboard the camera 10 of a standard operating system.

Figure 7:
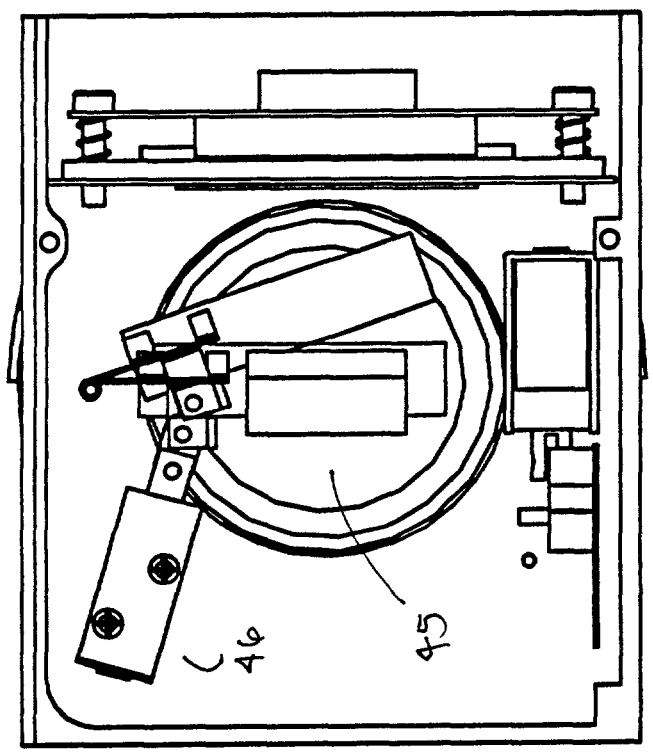
FIG. 7 shows, in a partially cut away elevational view, components of the present invention directed toward dark value calibration of charge coupled devices.

Shutter Mechanism for Dark Value Calibration:

As shown in FIG. 7, a solenoid actuated shutter mechanism 45 is preferably provided for calibration of the charge coupled device or devices 27 to a "dark" value. In operation, a two-stage solenoid mechanism 46, which is adapted for power conservation to be at rest with the shutter mechanism in either the open or closed position, is actuated to block light from through the lens 11 to the camera's charge coupled device or devices 27. In this manner, a subtractive coefficient may be determined and then used to provide a correction factor for the rectification of manufacturing defects and/or other inconsistencies in the pixels of the charge coupled devices 27. In the alternative, however, those of ordinary skill in the art will recognize that such a shutter mechanism 45 may be obviated by implementation of the present invention with charge coupled devices 27 which themselves implement newer technologies such as, for example, pixel averaging or summing capabilities.

Selectively Utilizable Peripheral Device Mode:

Prior art digital panoramic cameras have generally operated only as peripheral devices and, therefore, have been implemented with limited processing capabilities. As a result, pan speeds, known to be of great importance to achieving a desired image quality, have been limited by the ability to export acquired image data through standard port technologies to a host or controlling computer. As has been previously noted, however, the digital panoramic camera 10 of the present invention comprises a microprocessor 47 capable of running a conventional operating system. In addition to the advantages previously discussed, the implementation of an autonomous operating system in the present invention allows storage of acquired image data on-board the camera through a high-speed internal bus architecture. The running on-board the camera 10 of such an operating system does, however, produce an issue of compatibility with off-the-shelf applications during, for example, transfer of acquired imagery to a desktop computer or the like.

As a result of this difficulty, Applicant has devised a novel scheme for selectively operating the camera 10 of the present invention as either a stand-alone computer or a peripheral device, whereby the camera 10 may be interfaced with a conventional personal computer. In particular, as shown in FIG. 8, a standard USB connector 48, or any other standardized high-speed data port, is provided for interface with a host computer. This otherwise standard USB connector 48, however, is provided with an integral switch 49, which is engaged by the presence of a plug in the connector 48. Operation of the switch 49 through engagement of the plug serves to prevent booting of the operating system at any time that it is desired to use the camera 10 as a peripheral device. In this manner, the camera's hard drive is available for the transfer of information to a host computer without the conflict as would arise from having multiple device controllers attempting to command the hard drive whereon the images are stored. Additionally, means for electrical and mechanical isolation of the USB connector 48 are provided to prevent the insertion or extraction of a USB plug while camera power is applied. In this manner, an attempt to operate the camera 10 as a peripheral device while the operating system is active is prevented.

While the foregoing description is exemplary of the preferred embodiment of the present invention, those of ordinary skill in the relevant arts will recognize the many variations, alterations, modifications, substitutions and the like as are readily possible, especially in light of this description, the accompanying drawings and claims drawn thereto. For example, one or more PCMCIA slots 21 and/or one or more battery doors 22, 24 may be provided in the power side 19, control side 23 or other appropriate area of the digital panoramic camera 10. Likewise, the rear compartment may be conveniently provided with handholds 26 to facilitate handling of the camera 10. In any case, because the scope of the present invention is much broader than any particular embodiment, the foregoing detailed description should not be construed as a limitation of the scope of the present invention, which is limited only by the claims appended hereto.

What is claimed is:

1. A digital panoramic camera for acquiring an image over an extended horizontal field of view, said digital panoramic camera comprising:
    a body for internally housing components of said digital panoramic camera, said body being adapted to receive a photographic lens;
    a dichroic filter arrangement, said dichroic filter arrangement being adapted to enable simultaneous separate imaging through said photographic lens of an image's red, blue and green color components and wherein said dichroic filter arrangement comprises:
        a first dichroic filter provided and positioned to reflect said blue color component in a first direction toward a first imaging device while passing said green color component and said red color component; and
        a second dichroic filter provided and positioned to reflect said green color in a second direction differing from said first direction toward a second imaging device component while passing said red color component in a third direction differing from said first direction and from said second direction toward a third imaging device;
    a rotational mount integral with said body and providing said digital panoramic camera with an axis of rotation such that said axis of rotation passes through the front nodal point of said photographic lens as said photographic lens is received upon said body; and
    wherein the internally housed components of said digital panoramic camera are distributed about said axis of rotation such that the weight of said digital panoramic camera is substantially evenly distributed about said axis of rotation.

2. A digital panoramic camera for acquiring an image over an extended horizontal field of view, said digital panoramic camera comprising:
    a body for internally housing components of said digital panoramic camera;
    a photographic lens, said photographic lens being received by said body;
    a dichroic filter arrangement, said dichroic filter arrangement being adapted to enable simultaneous separate imaging through said photographic lens of an image's red, blue and green color components and wherein said dichroic filter arrangement comprises:
        a first dichroic filter provided and positioned to reflect said blue color component in a first direction toward a first imaging device while passing said green color component and said red color component; and
        a second dichroic filter provided and positioned to reflect said green color in a second direction differing from said first direction toward a second imaging device component while passing said red color component in a third direction differing from said first direction and from said second direction toward a third imaging device;
    a rotational mount integral with said body and providing said digital panoramic camera with an axis of rotation such that said axis of rotation passes through the front nodal point of said photographic lens; and
    wherein the internally housed components of said digital panoramic camera are distributed about said axis of rotation such that the weight of said digital panoramic camera is substantially evenly distributed about said axis of rotation.

3. The digital panoramic camera as recited in claim 2, wherein said body comprises a vertically oriented slotted aperture in a front part of said digital panoramic camera.

4. The digital panoramic camera as recited in claim 3, wherein said vertically oriented slotted aperture is adapted to enable placement forward of said photographic lens, yet outside of said photographic lens' field of view, of at least a portion of said digital panoramic camera's internally housed components.

5. The digital panoramic camera as recited in claim 3, wherein said vertically oriented slotted aperture comprises a slanted face.

6. The digital panoramic camera as recited in claim 2, said digital panoramic camera further comprising an integral user interface in a rear part of said digital panoramic camera.

7. The digital panoramic camera as recited in claim 6, wherein said integral user interface comprises a display and an input device.

8. The digital panoramic camera as recited in claim 7, wherein said digital panoramic camera further comprises a mirror located between said axis of rotation and said user interface, said mirror being oriented to redirect light passing through said photographic lens into a transverse axis within said digital panoramic camera.

9. The digital panoramic camera as recited in claim 2, said digital panoramic camera further comprising a remote transmission system, said remote transmission system being adapted to transmit image data from said digital panoramic camera and to receive control information at said digital panoramic camera.

10. The digital panoramic camera as recited in claim 9, wherein said remote transmission system is microprocessor-based.

11. The digital panoramic camera as recited in claim 9, wherein said microprocessor-based remote transmission system is implemented about a standardized operating system.

12. The digital panoramic camera as recited in claim 2, said digital panoramic camera further comprising a microprocessor-based control system.

13. The digital panoramic camera as recited in claim 12, said digital panoramic camera further comprising a mass storage device.

14. The digital panoramic camera as recited in claim 13, wherein said mass storage device comprises a magnetic storage disk.

15. The digital panoramic camera as recited in claim 13, wherein said microprocessor-based control system is adapted to operate said digital panoramic camera according to a standardized operating system located upon said mass storage device.

16. The digital panoramic camera as recited in claim 15, wherein said mass storage device is operable as a peripheral device under the control of an external computing platform.

17. The digital panoramic camera as recited in claim 16, said digital panoramic camera further comprising a switched interface to said mass storage device, said switched interface being adapted to enable or disable operation of said control system based upon the presence of a connector.

18. The digital panoramic camera as recited in claim 2, said digital panoramic camera further comprising an active shade system, said active shade system being adapted to track a point source for the reduced introduction through said photographic lens of light from the point source.

19. The digital panoramic camera as recited in claim 2, said digital panoramic camera further comprising:
- at least one charge coupled device in an internal compartment of said digital panoramic camera;
- a slot into said internal compartment, said slot being adapted for a selective admission to said internal compartment of light; and
- a shutter mechanism, said shutter mechanism being adapted to prevent, for an indefinite time, admission of light through said slot to said internal compartment, thereby enabling dark value calibration of said charge coupled device.

20. The digital panoramic camera as recited in claim 2, wherein said photographic lens comprises an integral lens cover, said integral lens cover having an aperture corresponding to said photographic lens' maximum aperture.

21. The digital panoramic camera as recited in claim 2, wherein said photographic lens comprises a sectional shape substantially corresponding to only a surface area required to fully illuminate an imaging medium in said digital panoramic camera.

* * * * *